(12) United States Patent
Tamura (10) Patent No.: US 8,962,095 B2
(45) Date of Patent: Feb. 24, 2015

(54) ELECTROSTATIC COATING METHOD AND ELECTROSTATIC COATING GUN

(75) Inventor: Yoshinobu Tamura, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 13/697,146

(22) PCT Filed: May 31, 2011

(86) PCT No.: PCT/JP2011/062529
§ 371 (c)(1),
(2), (4) Date: Nov. 15, 2012

(87) PCT Pub. No.: WO2011/152418
PCT Pub. Date: Dec. 8, 2011

(65) Prior Publication Data
US 2013/0052362 A1 Feb. 28, 2013

(30) Foreign Application Priority Data
May 31, 2010 (JP) ................................ 2010-124551

(51) Int. Cl.
*B05D 1/04* (2006.01)
*B05B 5/03* (2006.01)
*B05B 5/053* (2006.01)
*B05B 5/04* (2006.01)

(52) U.S. Cl.
CPC .............. *B05B 5/032* (2013.01); *B05B 5/0535* (2013.01); *B05D 1/045* (2013.01); *B05B 5/0426* (2013.01)
USPC .......................................... 427/470; 427/483

(58) Field of Classification Search
USPC ................................................. 427/470, 483
See application file for complete search history.

(56) References Cited

U.S. PATENT DOCUMENTS

| 3,236,679 | A | * | 2/1966 | Spiller et al. | .................. 427/475 |
| 5,044,564 | A | * | 9/1991 | Sickles | ...................... 239/690.1 |
| 5,928,731 | A | | 7/1999 | Yanagida et al. | |
| 6,082,628 | A | * | 7/2000 | Hutchins | ........................... 239/3 |
| 6,270,853 | B1 | * | 8/2001 | Brown et al. | ................. 427/470 |

FOREIGN PATENT DOCUMENTS

| GB | 2325870 A | 12/1998 |
| JP | 59-193164 A | 11/1984 |
| JP | 8-155350 A | 6/1996 |
| JP | 09-173961 A | 7/1997 |
| JP | 09-192586 A | 7/1997 |
| JP | 10-057846 A | 3/1998 |
| JP | 2000-501339 A | 2/2000 |
| JP | 2005-169353 A | 6/2005 |
| JP | 2007-038081 A | 2/2007 |
| WO | 98/58748 | 12/1998 |

OTHER PUBLICATIONS

International Search Report of PCT/JP2011/062529 dated Aug. 23, 2011.
Communication dated Feb. 4, 2014, issued by the Korean Intellectual Property Office in counterpart Korean application No. 10-2012-7031293, 11 total pages.

(Continued)

*Primary Examiner* — Frederick Parker
(74) *Attorney, Agent, or Firm* — Sughrue Mion, PLLC; Richard C. Turner (57) ABSTRACT

A low conductivity is provided to a coating surface 21 of a non-conductive coating target 20, and the coating surface 21 is coated with a charged paint while free ions are suppressed.

5 Claims, 10 Drawing Sheets

(56) References Cited

OTHER PUBLICATIONS

English Translation of Japanese Office Action (Notification of Reasons for Refusal) dated Feb. 14, 2014, in counterpart JP Patent Application No. 2010124551.

Communication dated Sep. 4, 2014 from the European Patent Office in counterpart application No. 11789821.3.
Communication dated Oct. 24, 2014 from the Japanese Patent Office in counterpart application No. 2010-124551.

* cited by examiner

TABLE 1: RESULT OF EFFECT VERIFICATION EXPERIMENT 1

| PAINT (VOLUME RESISTANCE VALUE) | HIGH VOLTAGE APPLICATION (ELECTROSTATIC COATING METHOD) | RESULT OF EFFECT VERIFICATION EXPERIMENT | APPLIED HIGH VOLTAGE | | | |
|---|---|---|---|---|---|---|
| | | | 0kV | 30kV | 60kV | 90kV |
| CONDUCTIVE (1MΩcm) | DIRECT APPLICATION (SECOND EMBODIMENT) | PAINT APPLICATION EFFICIENCY, % | 4.7% | 13.0% | 27.0% | 27.8% |
| | | BACK SURFACE-COATING STATE | × MISTY | △ THIN COATING | ○ FAVORABLE | ○ FAVORABLE |
| | | COATING CURRENT VALUE | 0μA | 3μA | 11μA | 26μA |
| | DIRECT APPLICATION | PAINT APPLICATION EFFICIENCY, % | 4.7% | 3.8% | 4.0% | 9.6% |
| | | BACK SURFACE-COATING STATE | × MISTY | × MISTY | × MISTY | × MISTY |
| | | COATING CURRENT VALUE | 0μA | 0μA | 1μA | 7μA |
| NORMAL (200MΩcm) | CORONA DISCHARGE + FREE ION-REMOVING ELECTRODE (FIRST EMBODIMENT) | PAINT APPLICATION EFFICIENCY, % | — | — | 23.7% | — |
| | | BACK SURFACE-COATING STATE | — | — | ○ FAVORABLE | — |
| | | COATING CURRENT VALUE | — | — | 105μA | — |
| | ONLY CORONA DISCHARGE (NO FREE-ION SUPPRESSION) | PAINT APPLICATION EFFICIENCY, % | — | — | 27.0% | — |
| | | BACK SURFACE-COATING STATE | — | — | △ THIN COATING | — |
| | | COATING CURRENT VALUE | — | — | 18μA | — |

FIG. 12

ELECTROSTATIC COATING METHOD AND ELECTROSTATIC COATING GUN

CROSS REFERENCE TO RELATED APPLICATIONS

This application is a National Stage of International Application No. PCT/JP2011/062529 filed May 31, 2011, claiming priority based on Japanese Patent Application No. 2010-124551 filed May 31, 2010, the contents of all of which are incorporated herein by reference in their entirety.

TECHNICAL FIELD

The present invention relates to an electrostatic coating method and an electrostatic coating gun for a low-conductive coating surface.

BACKGROUND ART

Generally, electrostatic coating refers to a coating method in which a paint is efficiently applied to a coating target by use of an electrostatic force by negatively charging paint particles and forming an electrostatic field (lines of electric force) with application of a high voltage between the coating target used as an earth electrode and an electrode of the coating apparatus used as a cathode. Electrostatic coating can produce effects such as improvement in coating efficiency (shortening of a coating period because of improved wrap around of the coating) and improvement in paint application efficiency (reduction in the amount of used paint because of an improved ratio of paint amount applied on a coating target).

Since the coating target by electrostatic coating serves as an electrode, the target needs to have a conductivity. When electrostatic coating is performed on a non-conductive coating target, the following techniques are employed:
  providing a conductivity to a material by mixing with a conductive material or a conducting agent.
  providing a conductivity to a coating surface by application of a conductive film such as a conductive primer.
  providing a temporary low conductivity to a coating surface by an antistatic treatment such as application of a surfactant.
  providing a low conductivity to a coating surface by grounding of the coating surface and use of a conductive paint.

CITATION LIST

Patent Literatures

Patent Literature 1: Japanese Patent Application Publication No. 2005-169353
Patent Literature 2: Japanese Patent Application Publication No. 2007-38081

SUMMARY OF INVENTION

Technical Problems

In the case of providing a conductivity by mixing with a conductive material or the like, the performance of a final product may be deteriorated depending on the mixed conductive material or the like. Further, the mixing with the conductive material or the like increases the cost.

In the case of providing a conductivity by application of a conductive film, a step of applying the conductive film is required as a pretreatment of electrostatic coating. This increases man-hours and cost.

In the case of providing a low conductivity by an antistatic treatment such as application of a surfactant, the surfactant has to be applied evenly all over the coating surface. In addition, the antistatic effect is obtained with the emergence of a film of water molecules formed as moisture in air is adsorbed to the surfactant film on the coating surface. Accordingly, this technique generally requires a certain control to keep the relative humidity exceeding 60%. Insufficient humidity control causes variation in the paint application efficiency varies and unevenness of the coating, and thereby deteriorates the coating quality. For this reason, as in the above-described case of applying a conductive film, a step of applying a surfactant is required as a pretreatment of electrostatic coating. This also increases man-hours and cost. Particularly, a coating target having a complex shape such as a radiator grille of an automobile requires appropriate facility and control. Hence, the cost is greatly increased.

In contrast, in the case of providing a low conductivity by grounding of the coating surface and use of a conductive paint, a conductive paint is applied from around the grounded portion of the coating surface and then is spread out. Thus, the increases in man-hours and cost are suppressed. Nevertheless, during electrostatic coating, it is necessary to continuously maintain the energized state of the grounded portion (for example, a metal part of a jig for holding the coating target) and the contact state between the grounded portion and the coating target. For this reason, careful maintenances are required such as frequent removal of dirt on the grounded portion, and the operation is troublesome. Moreover, a low conductivity is provided to a coating surface by coating with a conductive paint. For this reason, at the initial stage of coating, a coating surface not provided with a low conductivity is coated, and therefore the effects of electrostatic coating such as improvements in wrap around and a paint application efficiency cannot be obtained.

The present invention has been made in view of the above-described circumstances. An object of the present invention is to provide an electrostatic coating method and an electrostatic coating gun for a non-conductive coating target, enabling continuous application of favorable electrostatic coating while suppressing increases man-hours and cost without complicating the operation.

Solution to Problems

In order to achieve the above object, in an electrostatic coating method according to the present invention, a low-conductive coating surface is coated with a negatively charged paint while free ions are suppressed.

It is also possible that the paint is negatively charged by a corona discharge from a discharge electrode, and that free ions generated by the corona discharge are reduced or removed by a free ion-removing electrode disposed near the discharge electrode.

Moreover, it is also possible to use a conductive paint, and that the conductive paint is negatively charged by receiving direct application of a high voltage from a high-voltage electrode to suppress generation of free ions. The conductive paint has a volume resistance value of preferably 100 MΩcm or less, further preferably 20 MΩcm or less. In addition, the voltage to be applied is preferably 60 kV or higher.

Note that free ions refer to ions which are not utilized in charging of paint when the paint is negatively charged by a corona discharge. Such free ions mainly exist as ionized air.

In the above-described method, electrostatic coating is performed on a low-conductive coating surface while suppressing free ions. The suppression of free ions reduces the amount of ions reaching the coating surface, and suppresses charging of the low-conductive coating surface. Accordingly, it is possible to keep low the level of charging of the low-conductive coating surface, enabling continuous application of favorable electrostatic coating.

The method in which free ions generated by the corona discharge are reduced or removed by the free ion-removing electrode is advantageous in that various kinds of paints are usable.

Meanwhile, the method in which the conductive paint is negatively charged by receiving direct application of a high voltage to suppress generation of free ions eliminates the need for the corona discharge electrode and the free ion-removing electrode. The method is advantageous in that: there is no paint-dirt problem from the free ion-removing electrode; there is no spark risk problem from the corona discharge electrode; and there are improvements in coating uniformity represented by an improved paint-penetrating ability into a recessed portion on the coating target because there is no line of electric force between the corona discharge electrode and the coating target.

An electrostatic coating gun according to the present invention includes a paint supply duct, a high-voltage electrode, and an ejection port. A conductive paint passes through the paint supply duct. The high-voltage electrode is provided in the paint supply duct, and configured to directly apply a high voltage to the conductive paint passing through the paint supply duct to negatively charge the conductive paint. The ejection port is provided at a tip end of the paint supply duct or in the vicinity thereof, and configured to eject the negatively charged conductive paint to outside. In other words, the electrostatic coating gun does not have a discharge electrode for a corona discharge to negatively charge a conductive paint.

In a case where a coating target is non-conductive, a low conductivity is provided to the coating surface. The low conductivity may be provided to the coating surface by at least one of: an antistatic treatment on the coating surface; and grounding of the coating surface and use of a conductive paint. The antistatic treatment on the coating surface maybe performed by coating the coating surface with an antistatic solution by a wipe application.

Advantageous Effects of Invention

The present invention enables continuous application of favorable electrostatic coating while suppressing increases in man-hours and cost without complicating the operation.

DESCRIPTION OF EMBODIMENTS

<First Embodiment>

Hereinafter, a first embodiment of the present invention will be described with reference to the drawings. Note that in the following description, the terms "up" and "down" correspond to upper and down sides in a vertical direction in FIG. 1, while the terms "front" and "rear" correspond to left and right in FIG. 1.

Figure 1:
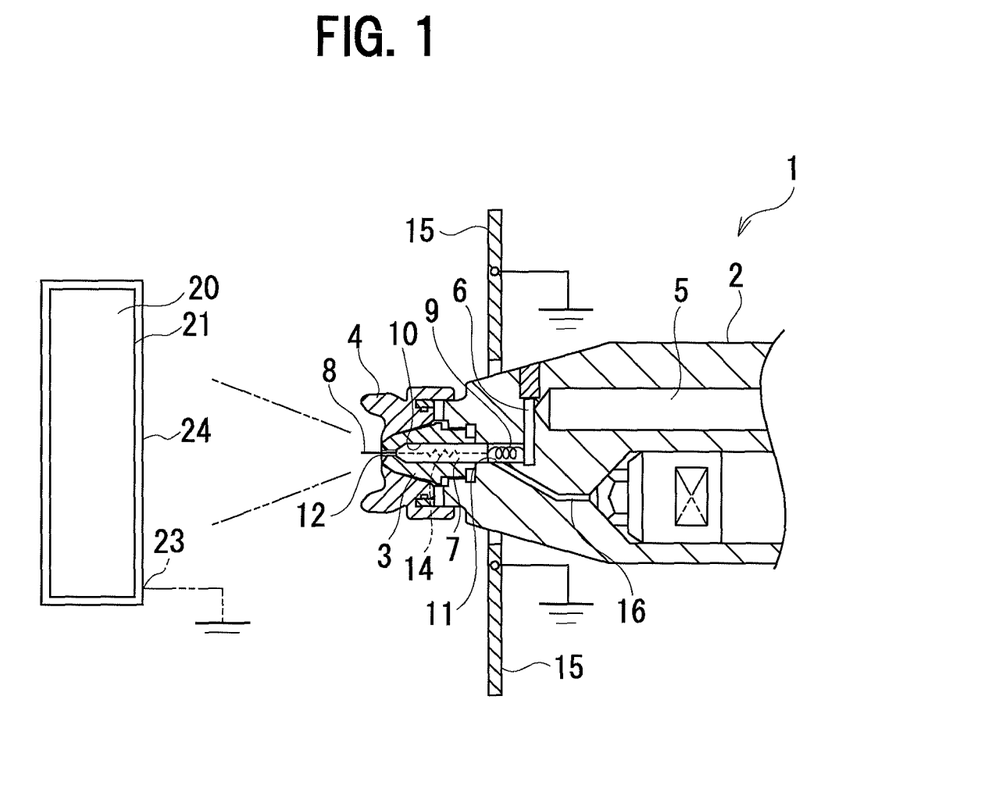
FIG. 1 is a cross-sectional view of an electrostatic coating gun of a first embodiment.
Figure 2:
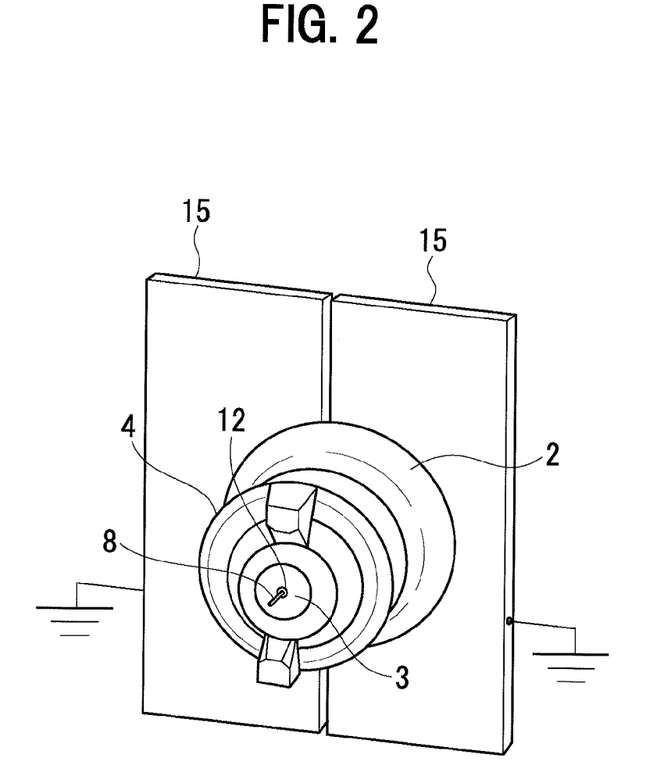
FIG. 2 is an external perspective view of the electrostatic coating gun in FIG. 1.
Figure 3:
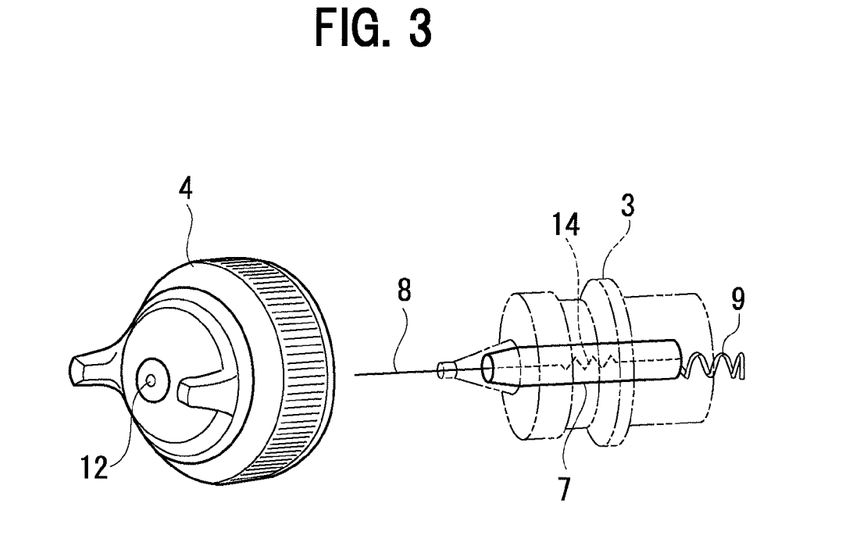
FIG. 3 is an exploded perspective view of the electrostatic coating gun in FIG. 1.

As shown in FIGS. 1 to 3, a spray gun (electrostatic coating gun) 1 of this embodiment is for example an automatic spray gun, and is used for electrostatic coating of a non-conductive coating target 20. The spray gun 1 includes: a gun body 2 made of an insulating resin; a paint nozzle 3 made of an insulating resin and attached to a tip end portion of the gun body 2; and an air cap (of a type for forming a mist in a fan pattern, for example) 4 made of an insulating resin and attached to a front end portion of the gun body 2 to cover the outer periphery of the paint nozzle 3.

An upper portion of the gun body 2 accommodates a cascade (high voltage generator) 5 in which a step-up transformer and a high-voltage rectifier circuit constituting a high-voltage generating circuit are integratedly molded. In a front upper portion of the gun body 2, a connection rod 6 having a conductivity is disposed downward. A front end of the cascade 5 abuts on a connection rod 6, and the two are electrically connected to each other.

A hole 10 is formed in a central portion of the paint nozzle 3. In the hole 10, an electrode sheath 7 made of an insulating resin is housed and supported. A rear end portion of the electrode sheath 7 is inserted into a hole 11 formed in the gun body 2. In a central portion of the electrode sheath 7, a corona pin (for example, discharge electrode made of tungsten) 8 is housed and supported. A front end of the hole 10 is communicatively connected to the outside via an ejection port 12. A front end of the corona pin 8 is inserted through the ejection port 12, while protruding from a front end of the electrode sheath 7. The corona pin 8 is connected to a front end side of a protective resistance 14 built in the electrode sheath 7. A rear end side of the protective resistance 14 is exposed from a rear end of the electrode sheath 7, and electrically connected to the connection rod 6 via a spring 9 housed in the hole 10.

The air cap 4 is provided with 2 types of air jet ports (the illustration is omitted). One of the air jet ports functions to atomize ejected paint as atomized air, while the other jet port functions to form a mist in a fan pattern as a pattern air.

A high frequency voltage inputted from a power connector (unillustrated) is supplied to the step-up transformer in the cascade 5 through a connection cable (unillustrated) in a grip. After increased by the step-up transformer, the supplied high frequency voltage is further increased by the high-voltage rectifier circuit and simultaneously rectified, and a direct high voltage of negative several tens of thousands of V is generated. The generated direct high voltage is applied from the cascade 5 to the corona pin 8 via the connection rod 6, the protective resistance 14 and the spring 9, and a large amount of negative ions are generated by a corona discharge (a stable discharge by dielectric breakdown of air caused by a non-uniform electric field concentrated at the pin tip). The high voltage to be applied is preferably 60 kV or higher.

A paint passage hole 16 is formed in the gun body 2, and communicatively connected to the hole 11. A conductive paint is supplied from the paint passage hole 16 to the hole 11, and ejected from an ejection port 12 after passing through the hole 10.

A stainless free ion-removing electrode (ground electrode) 15 connected to earth wires is detachably mounted on the outer periphery at the front end portion of the gun body 2. The free ion-removing electrode 15 is an attachable/detachable plate member consisting of two pieces, and is disposed in a wide area near a rear side of the corona pin 8.

A coating surface 21 of the non-conductive coating target is provided with a low conductivity by an antistatic treatment in advance. A grounded portion 23 of the non-conductive coating target 20 is grounded by being connected to an earth wire.

The antistatic treatment is performed by coating the coating surface 21 by a wipe application with an antistatic solution (for example, a solution in which a quaternary ammonium salt surfactant is dissolved at approximately 0.1 to 10% in isopropyl alcohol). An antistatic-treated film 24 is formed on the coating surface 21 by the wipe application. The wipe application refers to wiping the coating surface 21 using a cloth impregnated with an antistatic solution. By the wipe application, the antistatic solution is applied to the coating surface 21, while contaminant and dust adhering to the coating surface 21 are wiped off. The wipe application is a poor quality treatment causing an uneven application, and the operation is quite easy.

When an antistatic solution is applied to the coating surface 21 of the non-conductive coating target 20 as a pretreatment of electrostatic coating, generally a continuous film is formed uniformly on the entire area of the coating surface 21 by a spray application or immersion application to prevent a reduction in coating quality. In contrast, in this embodiment, even when such a poor quality pretreatment as the wipe application is performed, a reduction in coating quality is prevented by an effect of suppressing free ions to be described below, and the pretreatment can be simplified.

A corona discharge occurs mainly between the corona pin 8 and the free ion-removing electrode 15. Atomized paint particles ejected from the paint ejection port 12 fly while passing through a discharge region thus generated. Thereby, the paint particles receive a charge and are negatively charged. The charged paint particles are attracted by an electrostatic force formed between the negative charge of the paint particles and a positive charge appearing on the surface of the ground target, what is called the Miller effect. Thus, the paint particles reach the coating surface 21. The charge having reached the coating surface 21 is discharged from the grounded portion 23 due to the low conductivity provided by the applied conductive paint and the antistatic-treated film 24. Meanwhile, the mass of free ions not contributing to the charging of the conductive paint is quite small, and thus such free ions hardly fly by the inertia, but fly toward the free ion-removing electrode 15 along the line of electric force and collides therewith, consequently losing the charge. In other words, the free ion-removing electrode reduces or removes free ions. In this way, mainly the charge carried by the applied paint particles reaches the coating surface 21, and charging of the coating surface 21 due to contact with air ionized by free ions is suppressed.

It has been verified that the low conductivity provided by the applied conductive paint and the antistatic-treated film 24 has a surface resistance value of approximately 700 M$\Omega/\square$ immediately after the conductive paint is applied by a thick of approximately 30 μm on the antistatic-treated film 24. This surface resistance value is far higher than those of a metal coating target (whose surface resistance value is almost zero $\Omega/\square$) and a coating target on which a conductive primer is applied (the surface resistance value is approximately 10 M$\Omega/\square$). Thus, in a case where electrostatic coating is performed without suppressing free ions, a large amount of charge is supplied to the non-conductive coating target 20 by the free ions, so that the charge cannot be discharged from the grounded portion 23 at a right timing, and the non-conductive coating target 20 is charged at a high level. As a result, the charge thus remained causes an electrostatic repulsion, and the electrostatic repulsion leads to various troubles in electrostatic coating such as uneven coating thickness, inadequate coating wrap around, thin coating, lowered paint application efficiency, and spray return to coating equipment and a coating operator. Preventive control for such troubles is difficult. It is impossible to prevent the troubles particularly in a case of a non-conductive coating target having a large and complex shape such as a radiator grille of an automobile. In practice, electrostatic coating is performed while providing a conductivity by mixing with a conductive material or the like or providing a conductivity by application of a conductive primer.

In contrast, this embodiment makes it possible to keep the level of charging of the non-conductive coating target 20 low by suppressing free ions. Thus, even when a non-conductive coating target has a large and complex shape, this embodiment enables continuous application of favorable electrostatic coating with simple operation while suppressing increases in man-hours and cost without requiring troublesome control.

Moreover, since a conductive paint does not have to be used, electrostatic coating can be performed on the non-conductive coating target 20 using various kinds of paints.

<Second Embodiment>

Next, a second embodiment of the present invention will be described with reference to the drawings. Note that in the following description, the terms "up" and "down" correspond to upper and down sides in a vertical direction in FIG. 4, while the terms "front" and "rear" correspond to left and right in FIG. 4. Moreover, the same reference signs denote constituents common with those in the first embodiment, and description thereof will be omitted.

In this embodiment, a conductive paint is used, and the conductive paint is negatively charged by direct application of a high voltage to the conductive paint without a corona discharge. Free ion-generation itself is suppressed.

Figure 4:
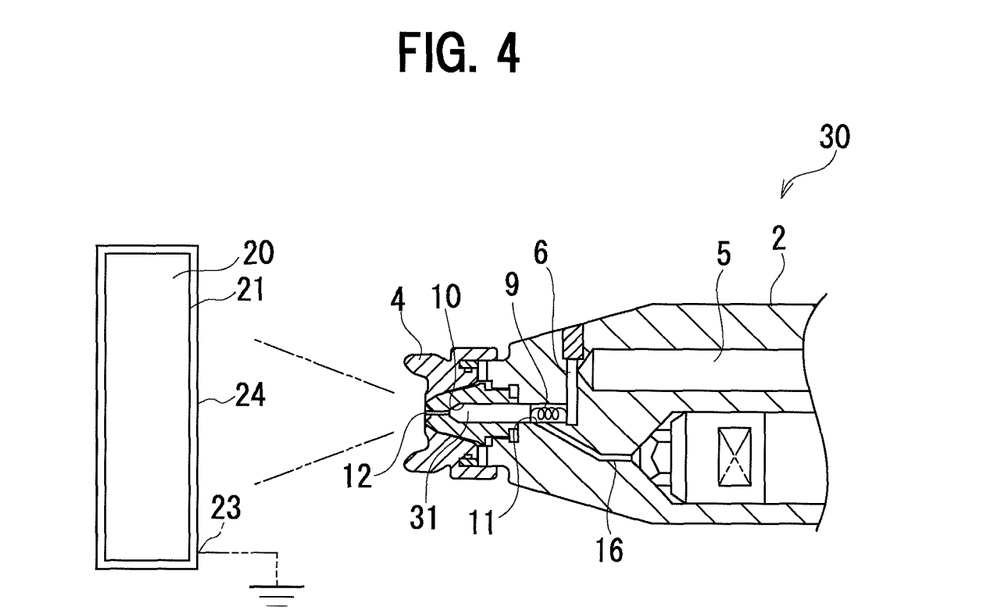
FIG. 4 is a cross-sectional view of an electrostatic coating gun of a second embodiment.
Figure 5:
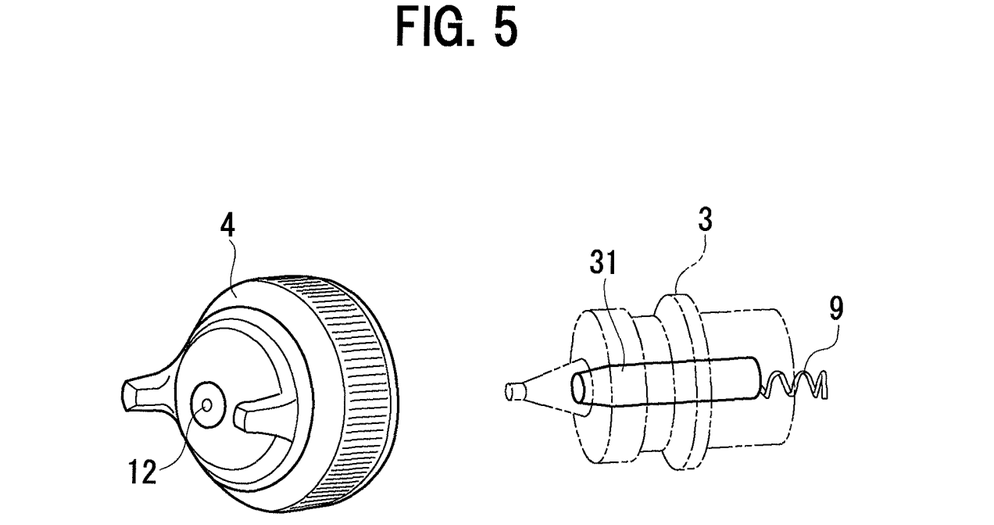
FIG. 5 is an exploded perspective view of the electrostatic coating gun in FIG. 2.
Figure 6:
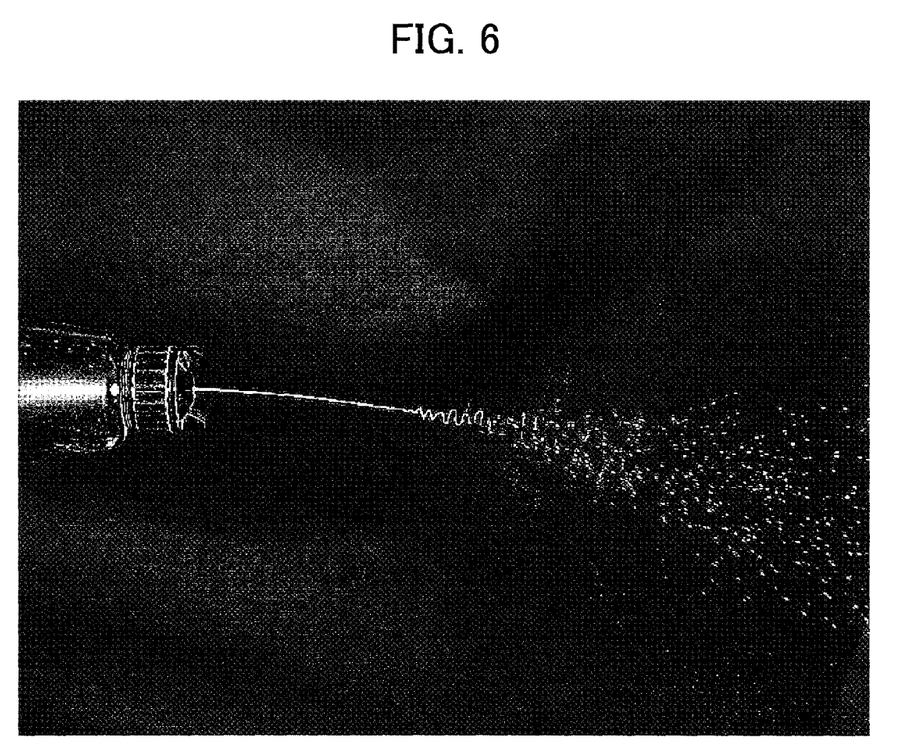
FIG. 6 is a photograph of an appearance of a water gun-like ejection of a conductive paint having a volume resistance value of 200 MΩcm to which a voltage of 60 k volts had been applied, the photograph taken after spraying air was stopped.
Figure 7:
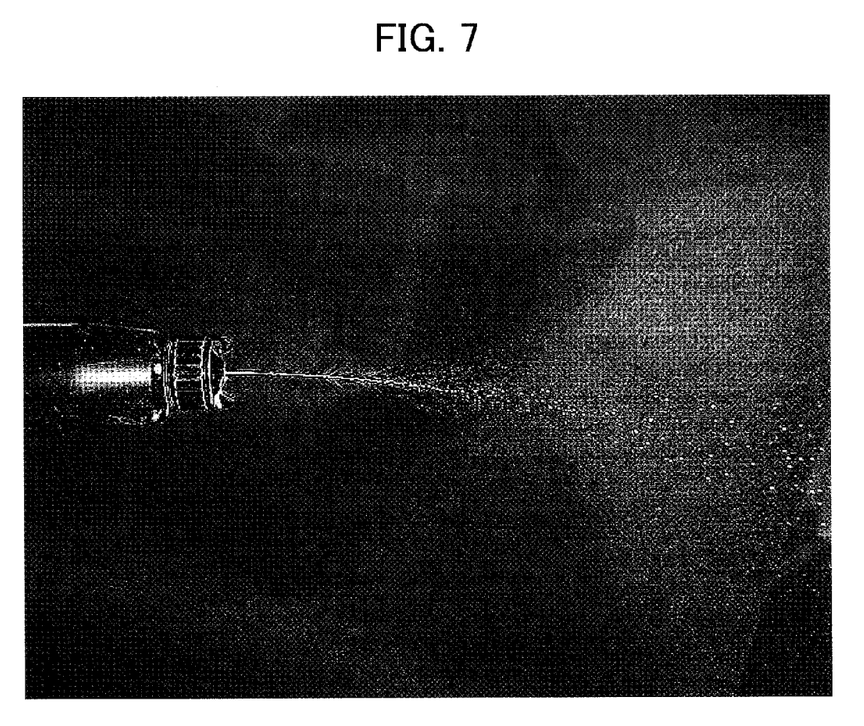
FIG. 7 is a photograph of an appearance of a water gun-like ejection of a conductive paint having a volume resistance value of 100 MΩcm to which a voltage of 60 k volts had been applied, the photograph taken after spraying air was stopped.
Figure 8:
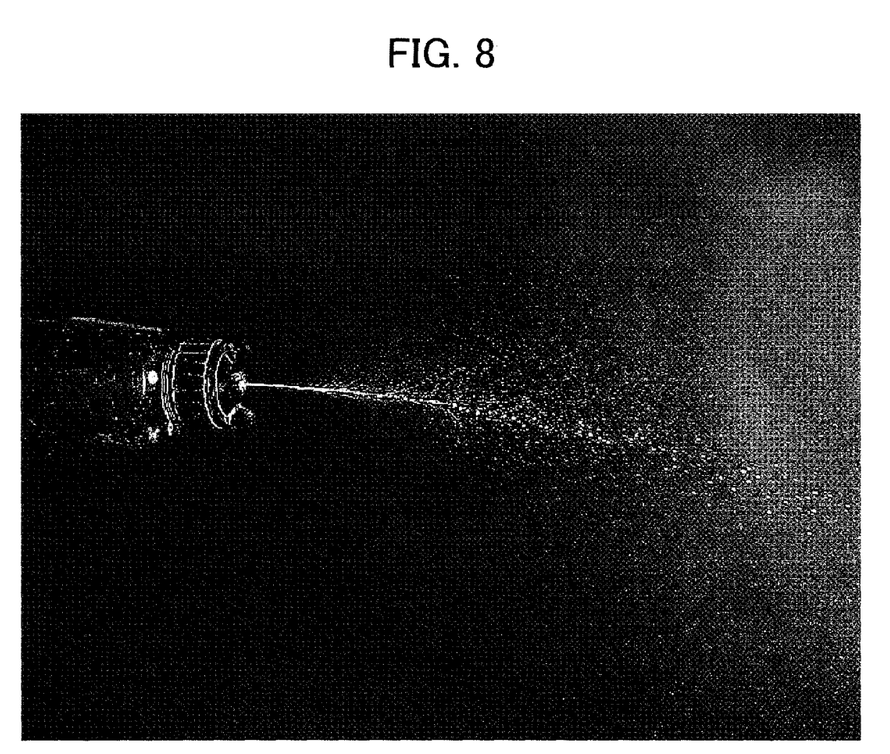
FIG. 8 is a photograph of an appearance of a water gun-like ejection of a conductive paint having a volume resistance value of 50 MΩcm to which a voltage of 60 k volts had been applied, the photograph taken after spraying air was stopped.
Figure 9:
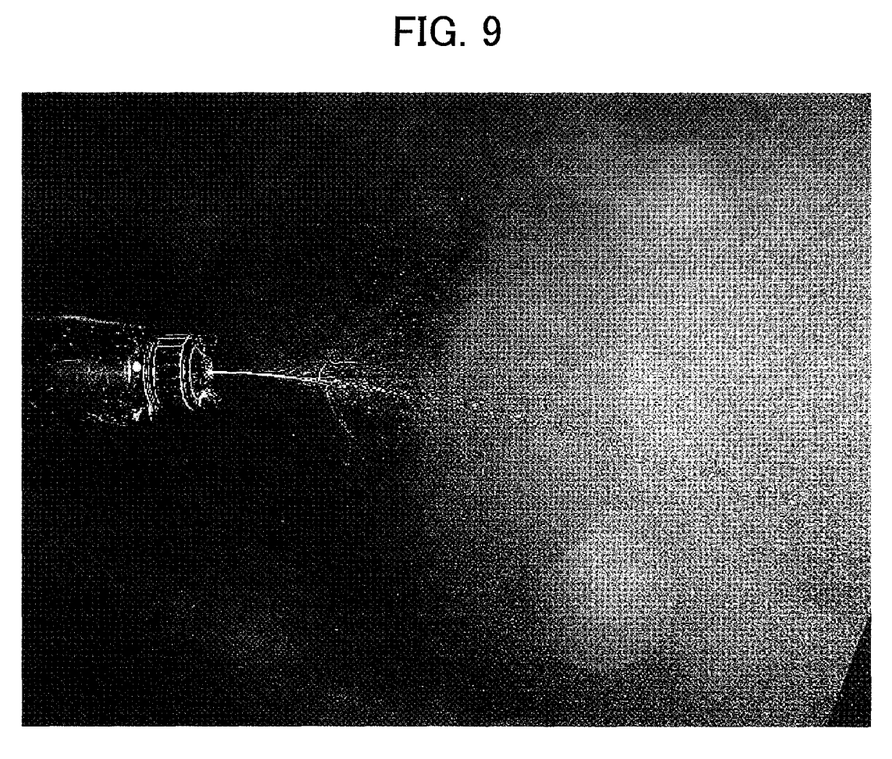
FIG. 9 is a photograph of an appearance of a water gun-like ejection of a conductive paint having a volume resistance value of 20 MΩcm to which a voltage of 60 k volts had been applied, the photograph taken after spraying air was stopped.
Figure 10:
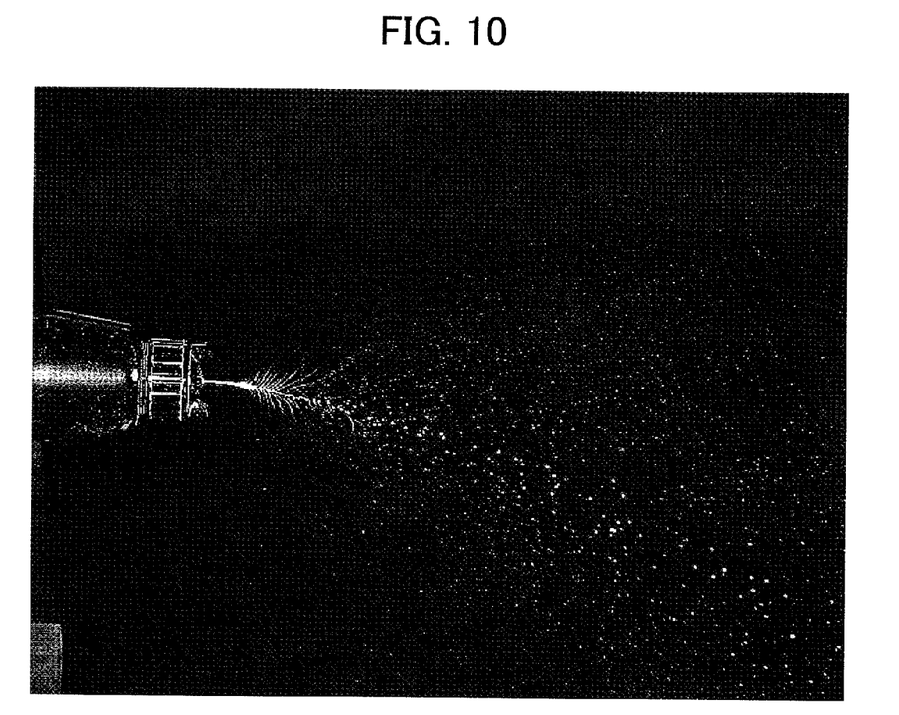
FIG. 10 is a photograph of an appearance of a water gun-like ejection of a conductive paint having a volume resistance value of 10 MΩcm to which a voltage of 60 k volts had been applied, the photograph taken after spraying air was stopped.

As shown in FIGS. 4 and 5, the paint nozzle 3 of a spray gun 30 is provided with, in place of the electrode sheath 7 made of an insulating resin in the first embodiment, a high-voltage directly-applying electrode (high-voltage electrode) 31 made of a metal and having approximately the same outer shape as the electrode sheath 7. A rear end of the high-voltage directly-applying electrode 31 is electrically connected to the connection rod 6 via the spring 9. Unlike the first embodiment, the corona pin 8 is not provided.

A direct high voltage is supplied from the cascade 5 to the high-voltage directly-applying electrode 31 via the connection rod 6 and the spring 9, and applied to a conductive paint passing through the hole 10 as the conductive paint comes into direct contact with the high-voltage directly-applying electrode 31. The conductive paint itself carries a charge as a discharge electrode. The paint particles are charged and atomized after ejected from the ejection port 12.

Next, description will be given of a state of the conductive paint applied by the contact with the high-voltage directly-applying electrode 31 with reference to FIGS. 6 to 10.

FIGS. 6 to 10 are photographs of an appearance of the conductive paint ejected like a water gun from the ejection port 12. The photographs were taken after jetting air from the air cap 4 that is a paint-atomizing unit of the gun body was completely stopped, and the volume resistance value of the conductive paint was changed while the application voltage was set at 60 kV. The volume resistance value was 200 MΩcm in FIG. 6; 100 MΩcm in FIG. 7; 50 MΩcm in FIG. 8; 20 MΩcm in FIGS. 9; and 10 MΩcm in FIG. 10.

As apparent from these figures, it can be seen that the thread-like liquid form of the paint of 200 MΩcm (FIG. 6) is one as obtained from a water gun; in contrast, as to the thread-like liquid form of the paint of 100 MΩcm (FIG. 7), an electrostatic repulsion occurs in the thread-like liquid form at a point several cm away after the ejection, and the paint is spread and atomized in the spine pattern. Moreover, it can be seen that the smaller the volume resistance value of the conductive paint, the smaller the voltage drop in the paint in the thread-like liquid form, increasing the effective voltage; thereby, the spread and atomized spine pattern is formed at an earlier stage, and the spine pattern also becomes significant.

In this embodiment, a conductive paint is negatively charged by receiving direct application of a high voltage to suppress free ion-generation itself. Accordingly, a corona discharge is not necessary, and free ion-generation by a corona discharge itself is suppressed. Thus, it is possible to keep the level of charging of the coating surface 21 further lower.

Moreover, with a simple structure in which the high-voltage directly-applying electrode 31 is provided in the hole (paint supply duct) 10, free ion-generation by a corona discharge itself is suppressed. This makes it possible to keep low the level of charging of the coating surface 21, and enabling continuous application of favorable electrostatic coating.

Particularly, since free ion-generation by a corona discharge itself is suppressed, a free ion-removing electrode for reducing or removing generated free ions is not necessary, and also cleaning and washing operations for the free ion-removing electrode are not required. Further, a discharge current can be suppressed to low, and a reduction in the capacity of a high voltage generator is achieved. Furthermore, unlike the corona pin, the high-voltage directly-applying electrode 31 is not exposed to the outside. This suppresses generation of a spark, and improves the safety.

Note that a water-soluble paint has a high conductivity, and is accordingly usable as a paint in this embodiment, provided that an countermeasure is taken to prevent a leakage of a high voltage from the paint passage.

<Effect Verification Experiment 1>

Next, description will be given of an effect verification experiment 1.

In this experiment, a 500-cc plastic bottle was used as a non-conductive coating target. An automatic electrostatic-coating spray gun attached to a reciprocator was reciprocated three times in a longitudinal direction, and paint was ejected only within the range of the plastic bottle to perform electrostatic coating. In this event, the movement of the spray gun was set in such a way that the conductive paint was applied from around a grounded portion of a coating surface and then was spread out. The high voltages applied to the conductive paint were 0 kV, 30 kV, 60 kV, and 90 kV. The used conductive paint was a 2-pack polyurethane paint to which a conducting agent had been added, and the volume resistance value was 1 MΩcm. The top surface (coating surface) of the plastic bottle was coated by a wipe application with a solution of 0.35% quaternary ammonium salt and isopropyl alcohol.

Figure 11:
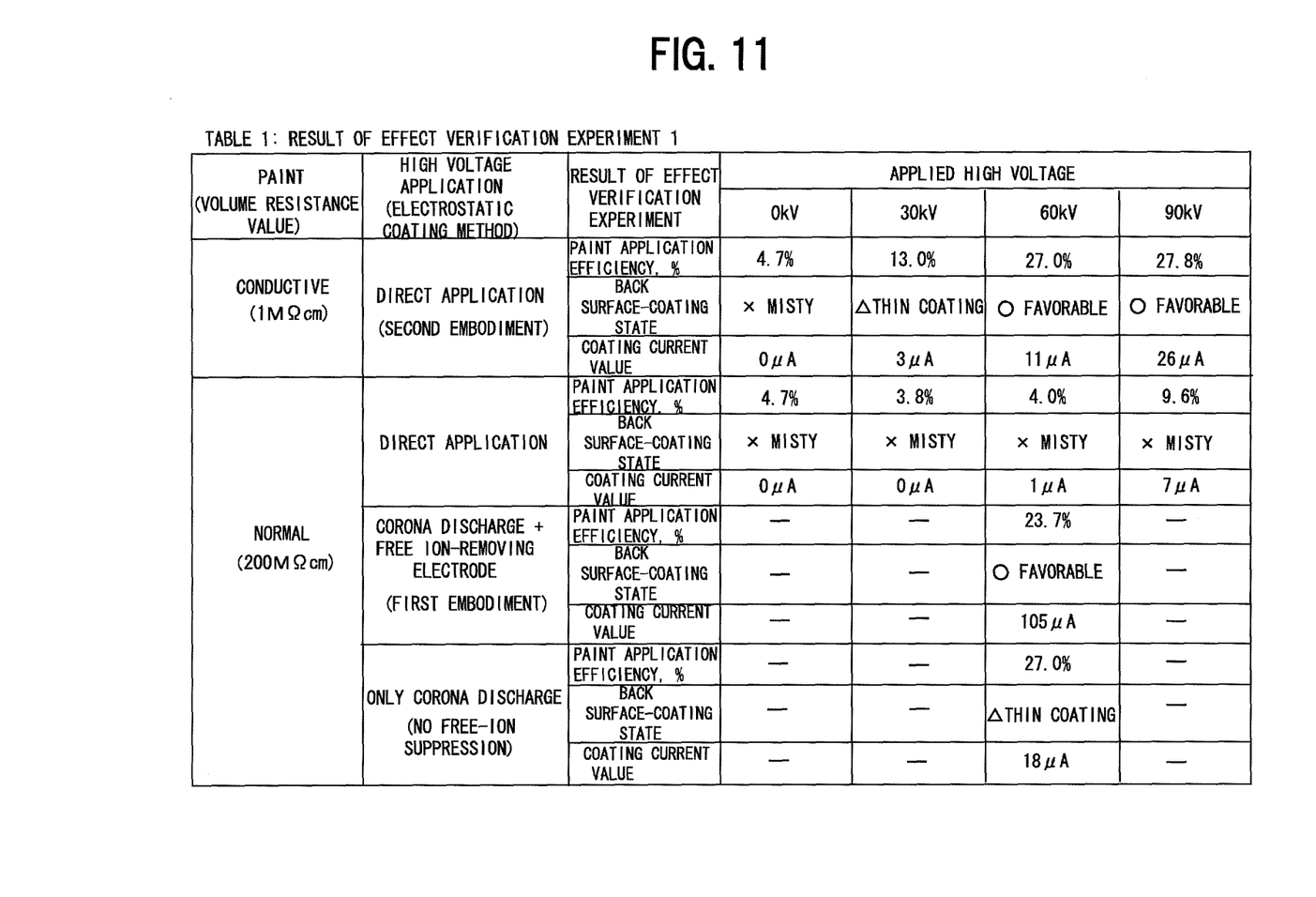
FIG. 11 is a table for illustrating the result of an effect verification experiment 1.

Table 1 in FIG. 11 shows the result of the effect verification experiment 1. From this result, the following can be seen. Note that the first embodiment corresponds to 60-kV corona discharge+free ion-removing electrode, and the second embodiment corresponds to 60-kV direct application.

In both of the first embodiment and the second embodiment, the paint transfer efficies were greatly improved from 4.7% to 23.7% and 27.0%, respectively. A reduction in the amount of paint used and a great reduction of paint not applied but discarded are possible.

In both of the first embodiment and the second embodiment, wrap around to the back surface of the plastic bottle (back surface-coating state) was good. Coating on a side surface, back surface, or the like in a face-to-face manner can be omitted. Accordingly, a great reduction in coating paths (shortening of the coating period) is possible.

In the second embodiment, the coating current value was greatly reduced in comparison with the first embodiment. A reduction in size (reduction in capacity) of high voltage generator is possible owing to the current reduction.

<Effect Verification Experiment 2>

Next, description will be given of an effect verification experiment 2.

In this experiment, a radiator grille made of an ASA resin was used as a non-conductive coating target. A coating robot including an automatic spray gun was used to perform coating by direct application at 0 kV (non-application) and electrostatic coating by 60-kV direct application (the second embodiment). Note that the other conditions were the same as those in the effect verification experiment 1.

As a result of the experiment, it was verified that the amount of paint used in the second embodiment was smaller by 28% than that in the non-application, and that the coating period by the robot was reduced from 60 seconds to 30 seconds, that is, by 50%.

Moreover, it was verified that a coating film was formed uniformly on an uneven surface and a side surface as a synergistic effect of improvements in paint application efficiency and wrap around, and the uniform coating ability of the coating was successfully demonstrated.

<Effect Verification Experiment 3>

Next, description will be given of an effect verification experiment 3.

In this experiment, the paint application efficiency was measured as in the effect verification experiment 1, but the high voltage applied to a conductive paint was set at 60 KV, and the volume resistance value of the conductive paint was changed from 200 MΩcm to 0.5 MΩcm.

Figure 12:
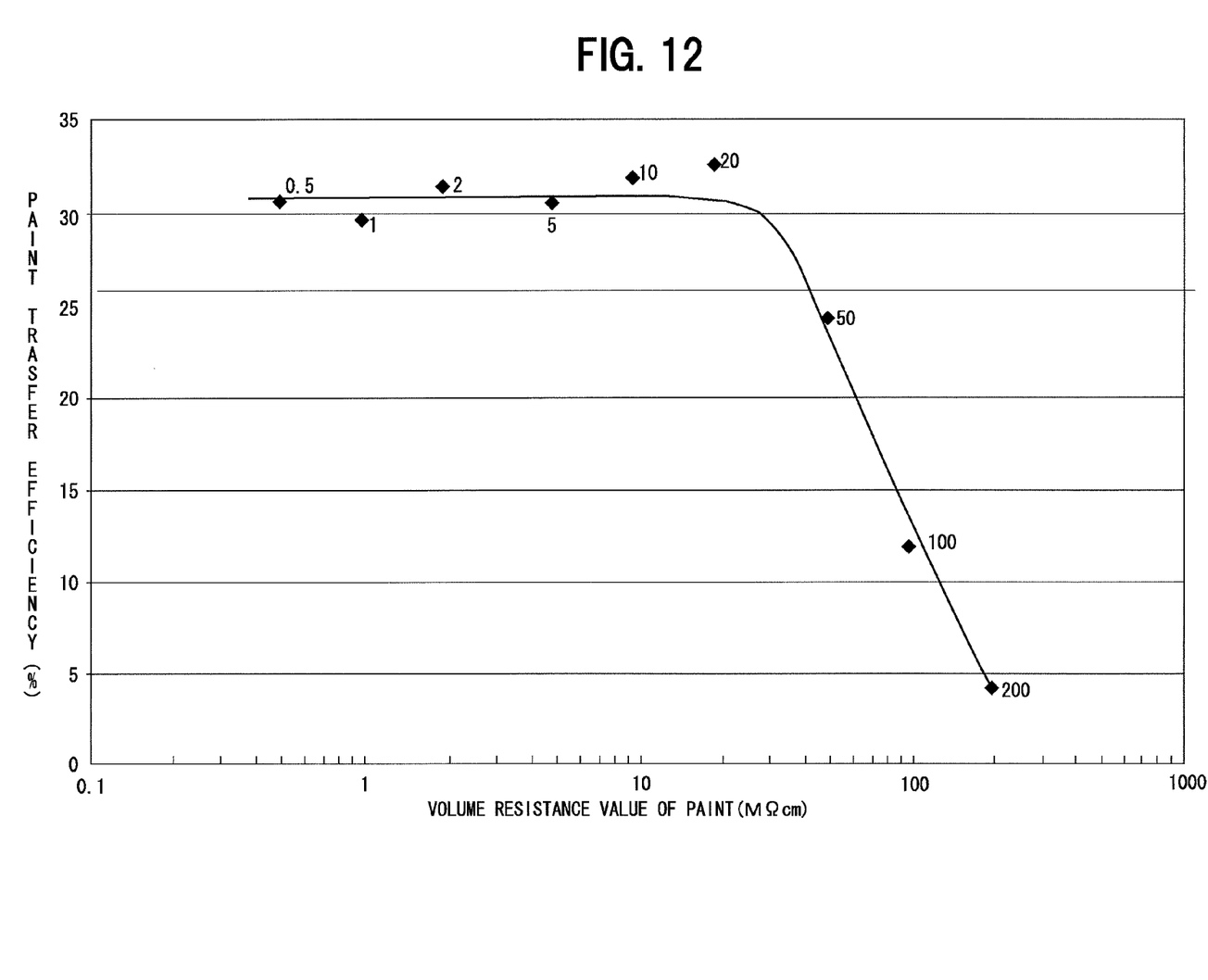
FIG. 12 is a graph for illustrating the result of an effect verification experiment 3.

FIG. 12 shows the result of the effect verification experiment 3. It can be seen from the result that the conductive paint has a volume resistance value of preferably 100 MΩcm or less, further preferably 20 MΩcm or less.

Note that in the above-described embodiment, the description has been given of the case where a low conductivity is provided to the coating surface 21 of the non-conductive coating target 20. Nevertheless, the present invention is applicable also to a coating target made of a low-conductive material. In this case, electrostatic coating can be performed without consideration of providing a low conductivity to a coating surface.

Moreover, in the above-described embodiment, a low conductivity is provided to the coating surface 21 by both of: the antistatic treatment on the coating surface 21 by application of the antistatic solution; and grounding of the coating surface 21 and use of the conductive paint. Nevertheless, a low conductivity may be provided to the coating surface 21 by one of the two treatments, or a low conductivity may be provided to the coating surface 21 by other methods.

Moreover, in the first embodiment, the description has been given of the case where the spray gun 1 of air-spray type is used as the electrostatic coating gun. Instead, a spray gun of air-less type for corona discharge may be used.

Moreover, in the second embodiment, the description has been given of the spray gun 30 of air-spray type as an electrostatic coating gun to negatively charge a conductive paint by directly applying a high voltage thereto. However, the electrostatic coating gun of the present invention is not limited thereto, and may be a rotary atomizing gun or an air-less spray gun having an internal structure in which a conductive paint is negatively charged by receiving direct application of a high voltage and a structure in which a high-voltage applying conductor for generating free ions (such as corona electrode pin, metal bell cup, metal spray cap, metal spray nozzle) is insulated.

Moreover, in the embodiments, the description has been given of the case where the electrode of the coating apparatus is used as a cathode and paint particles are negatively charged. Nevertheless, the paint particles may be positively charged using the electrode of the coating apparatus as an anode.

Hereinabove, the embodiments to which the invention made by the present inventor is applied have been described. However, the description and drawings which constitute part of the disclosure of the present invention by way of the embodiments do not limit the present invention. In other words, it should also be stated here as a matter of course that other embodiments, examples, operation techniques, and the like which can be made by those skilled in the art based on the above embodiments are all included in the scope of the present invention.

INDUSTRIAL APPLICABILITY

The present invention is widely usable for electrostatic coating of non-conductive or low-conductive coating targets.

REFERENCE SIGNS LIST

1: spray gun (electrostatic coating gun)
2: gun body
3: paint nozzle
4: air cap
5: cascade (high voltage generator)
7: electrode sheath
8: corona pin
10: hole (paint supply duct)
12: ejection port
15: free ion-removing electrode (ground electrode)
20: non-conductive coating target
21: coating surface
23: grounded portion
24: antistatic-treated film
30: spray gun (electrostatic coating gun)
31: high-voltage directly-applying electrode

The invention claimed is:

1. An electrostatic coating method comprising:
   charging conductive liquid paint negatively by contacting the conductive liquid paint with a high-voltage electrode and receiving direct application of a high voltage from the high-voltage electrode; and
   coating a coating surface with the negatively charged conductive liquid paint, the negatively charged conductive liquid paint acting as a discharge electrode suppressing generation of free ions.

2. The electrostatic coating method according to claim 1, wherein the high voltage is 30 kV or higher.

3. The electrostatic coating method according to claim 1, further comprising:
   providing the coating surface on a non-conductive coating target; and
   prior to the coating the coating surface, grounding the non-conductive coating target.

4. The electrostatic coating method according to claim 1, further comprising:
   providing the coating surface on a non-conductive coating target; and
   prior to the coating the coating surface, forming an antistatic treatment film on the coating surface by a wipe application.

5. The electrostatic coating method according to claim 1, wherein a surface resistance is equal to approximately 700Ω/□ immediately after the coating.

* * * * *